Sept. 8, 1936.   J. W. LEIGHTON   2,053,620
U-BOLT KICK SHACKLE
Filed Aug. 5, 1935
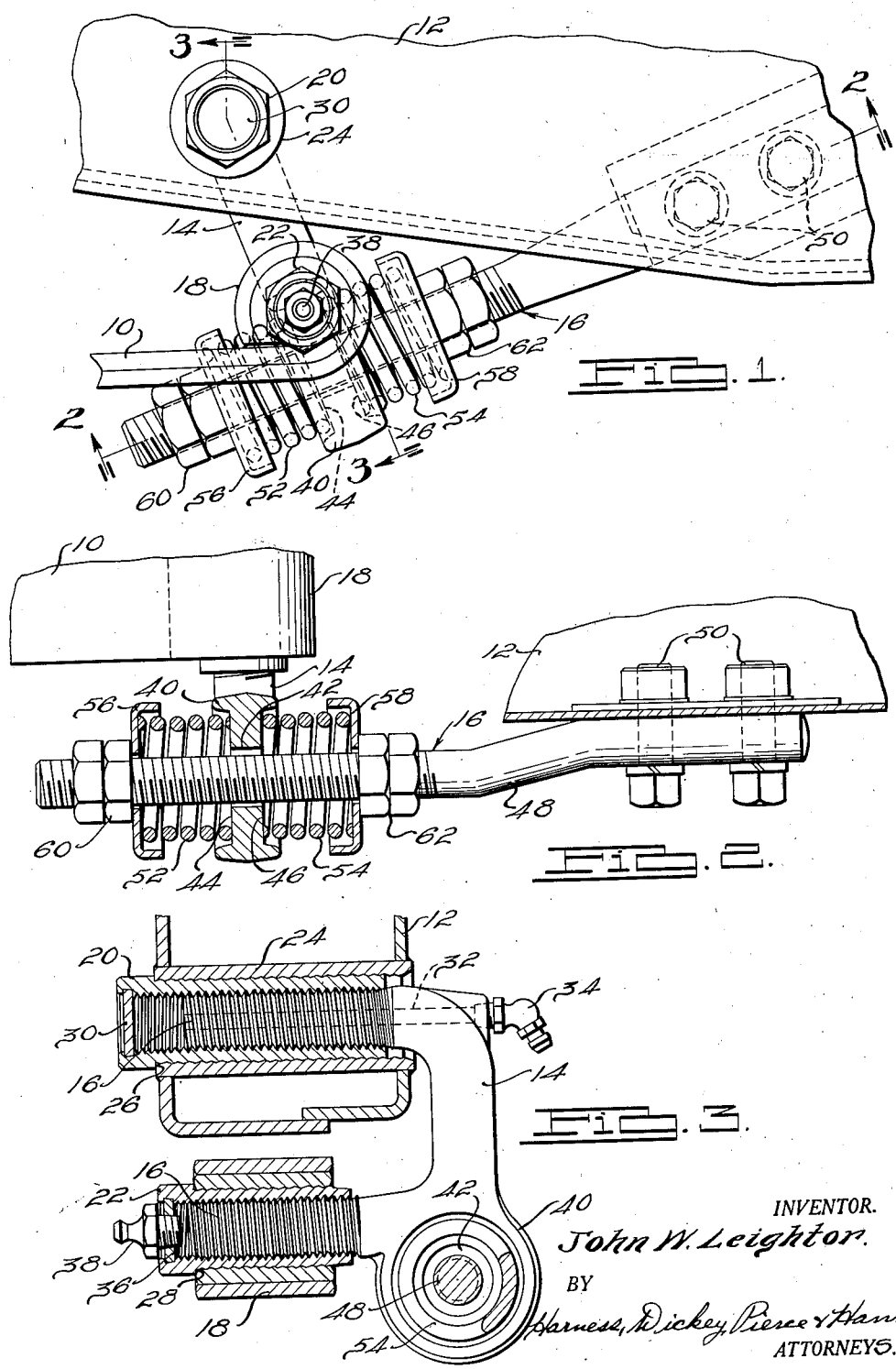
INVENTOR.
John W. Leighton.
BY
Harness, Dickey, Pierce & Hann.
ATTORNEYS.

Patented Sept. 8, 1936

2,053,620

UNITED STATES PATENT OFFICE 2,053,620

U-BOLT KICK SHACKLE

John W. Leighton, Port Huron, Mich.

Application August 5, 1935, Serial No. 34,752

8 Claims. (Cl. 267—17)

The present invention relates to spring suspensions, and more particularly to suspensions for the front springs of motor vehicles of the kick shackle type.

It is a further object of the present invention to provide a shackle connection of the kick type for a motor vehicle spring embodying a U-shaped shackle bolt having an integrally formed projection adapted for resilient connection to the vehicle frame.

It is a further object of the present invention to provide a shackle connection of the above stated type in which the U-shaped shackle bolt is adapted to swing with respect to the vehicle frame, and the projection is formed to support a double spring through which the shackle bolt is connected to the vehicle frame and the swinging thereof limited.

Other objects and advantages of the present construction appear in the following description and in the appended claims.

In the drawing, throughout the several views of which corresponding reference characters are used to designate corresponding parts, Figure 1 is a fragmentary view in side elevation of a kick shackle connection embodying the present invention;

Fig. 2 is a view in section taken along the line 2—2 of Fig. 1; and

Fig. 3 is a view in section taken along the line 3—3 of Fig. 1.

Kick shackles of the general type to which the present invention is directed have been generally adopted in the automobile industry to form a connection between the frame and the rear end of the front spring on the steering side of a vehicle. Conventionally, the front end of such steering side front spring is connected to the chassis through a shackle connection which is free to pivot both with respect to the frame and with respect to the spring. As will be understood, this front shackle connection is designed to absorb the changes in effective length of the springs occasioned by the flexing of the spring in operation. The rear end or kick shackle connection between the front spring and the frame in general is designed to permit a limited amount of relative movement between the rear end of the spring and the frame, against the bias of a centering spring or a pair of centering springs. The limited movement thus afforded has been found to minimize any jerking of the steering mechanism which might be occasioned by operating shocks to the spring.

The present invention is directed to the provision of a unitary shackle connection of the U-bolt type having a projection formed integrally therewith which is adapted to support the centering spring or springs and associated parts through which the resilient connection is provided.

In the form of the invention illustrated, the associated end of a conventional leaf spring is formed as an eye into which a shackle bushing is threaded and locked in place by the form of thread used. One leg of a U-shaped shackle bolt is threaded into the bushing, the cooperating threads being formed to provide a bearing fit of the relatively freely rotatable threaded type. The other leg of the U-bolt is similarly threadably and rotatably connected to the vehicle frame. A projection formed integrally with the U-bolt and extending downwardly therefrom near the base of the U provides a seat for a pair of oppositely disposed centering springs. A link passing through both springs and through the projection is rigidly connected to the vehicle frame. Shoulders formed on the links form seats for the outer ends of the centering springs, so that a pivotal movement of the U bolt with respect to the vehicle frame results in compressing one or the other of the centering springs, which accordingly act to limit such pivotal movement.

Considering the above mentioned elements in more detail and referring to the drawing, a conventional leaf spring 10 is connected to a vehicle frame 12 through the U-shaped shackle bolt 14, and through the resiliently associated link 16. The general construction of U bolt 14 and the connection of the respective legs 16 thereof to the vehicle frame 12 and the eye 18 of spring 10 respectively are preferably as disclosed in Patent No. 1,924,448, granted August 29, 1933 to the present applicant. As described in more detail in that patent, the substantially parallel legs 16 of bolt 14 are externally threaded with conventional threads which mate to provide a relatively freely pivotal bearing fit with corresponding internal threads formed in bushings 20 and 22, respectively. Bushings 20 and 22 are each externally threaded with threads which have the same pitch, but are cut substantially less deeply than the previously mentioned threads. The external threads on bushings 20 and 22 mate with corresponding internal threads formed in the sleeve 24 associated with frame 12 and in the spring eye 18 respectively. The last mentioned threads are so formed that a relatively free fit is provided. Shoulders 26 and 28 formed near the end of bushings 20 and 22 respectively seat against the ends of sleeve 22 and spring eye 18 and supply an end thrust which causes the cooperating lightly cut teeth to jamb and non-rotatably secure the bushings in the cooperating sleeve and spring eye respectively. One end of bushing 20 is closed by a welch washer 30, and lubricant may be supplied to the corresponding bearing through the line 32 and the lubricant fitting 34. The end of bushing 22 is similarly closed by a welch washer 36 which also accommodates a suitable lubricant fitting 38.

The parts thus far described may be assembled by moving the two legs of U-bolt 14 to the positions shown in Fig. 3, and thereafter threading the two bushings 20 and 22 simultaneously onto the legs 16 and into the associated sleeve 24 and spring eye 18 respectively. These parts of the assembly form a relatively freely pivotal connection between one end of spring 10 and frame 12.

A substantially circular projection 40 is formed integrally with bolt 14 and extends downwardly therefrom at the junction between the lower leg 16 and the base of the U. Projection 40 is provided with a central opening 42 and the two oppositely disposed recessed seat portions 44 and 46. Opening 42 is large enough to freely accommodate a bolt 48 which passes therethrough and is rigidly connected at its other end to frame 12 by the studs 50.

The recessed seat portions 44 and 46 of projection 40 form seats for the inner ends of the positioning springs 52 and 54 respectively, the other ends of which seat against cups 56 and 58. Cups 56 and 58 may be freely slid upon bolt 48 and the position thereof is fixed by cooperating pairs of lock nuts 60 and 62.

Preferably, both springs 52 and 54 are normally under a certain amount of compression to prevent rattling of the parts, and as will be understood, the parts are initially so adjusted that U-bolt 14 normally occupies substantially the position shown in Fig. 1, in which position it is resiliently retained by the pressure exerted by the balancing springs 52 and 54.

During the operation of the vehicle, however, and as a consequence of any relative movement which may occur between spring 10 and frame 12, a limited amount of swinging of U-bolt 14 about its connection to frame 12 is permitted subject to the opposing forces of the balancing springs 52 and 54. This limited amount of pivotal movement has been found in practice, as above stated, to minimize any jerking of the vehicle steering mechanism which might otherwise be occasioned by road shocks or other causes. It will be understood that the degree of movement thus permitted is positively limited by the spacing between the cups 56 and 58, and that a practical limitation is imposed thereon by the characteristics of the balancing springs. In the practice of the present invention, a floating movement of substantially three-sixteenths of an inch has been found satisfactory.

It will be evident that the kick shackle construction of the present invention provides an economically manufactured and simply assembled construction. It will also be evident that the invention may be embodied in forms other than that illustrated, within the spirit and scope thereof as defined in the appended claims.

What is claimed is:

1. A kick shackle connection for connecting a vehicle spring to a vehicle frame comprising, in combination, a U-shaped shackle bolt having a pair of spaced substantially parallel legs and an integrally formed projection positioned adjacent one of said legs, means for pivotally connecting said one of said legs to said spring only, means for pivotally connecting the other of said legs to said frame only, and means for resiliently connecting said projection to said frame.

2. A kick shackle connection for a vehicle spring comprising a shackle member having spaced substantially parallel legs and a depending integrally formed projection offset to the outside of one of said legs, means pivotally connecting said legs to the vehicle frame and said spring respectively, and a resilient connection between said projection and said frame.

3. A kick shackle connection for connecting a vehicle spring to a vehicle frame comprising a shackle member having spaced parallel legs, a connecting base and a projection integrally formed and extending to the outside of said member adjacent the junction between one of said legs and said base, means for pivotally connecting said legs to said vehicle frame and said spring respectively, and means for resiliently connecting said projection to said vehicle frame.

4. A kick shackle connection for connecting a vehicle spring to a vehicle frame comprising a U-bolt having a pair of spaced substantially parallel legs and an integrally formed projection positioned adjacent one of said legs, means forming a threaded bearing connection between said one of said legs and said spring, means forming a threaded bearing connection between the other of said legs and said frame, and means comprising a pair of balancing springs and a link for resiliently connecting said projection to said vehicle frame.

5. A kick shackle connection for connecting a vehicle spring to a vehicle frame comprising, in combination, a U-shaped shackle bolt having a pair of substantially parallel spaced legs and an integrally formed projection positioned adjacent one of said legs, said projection having an opening formed therein and having opposite sides formed to form spring seats, means forming a threaded bearing connection between said one of said legs and said vehicle spring, means forming a threaded bearing connection between the other of said legs and said vehicle frame, and means comprising a bolt and a pair of balancing springs seated respectively against the opposite sides of said projection for forming a resilient connection between said projection and said vehicle frame.

6. An article of manufacture comprising a U-shaped shackle bolt having spaced substantially parallel externally threaded legs, a base connecting said legs, and a projection integrally formed and extending to the outside of said bolt adjacent the junction between one of said legs and said base, said projection having an opening formed therein.

7. An article of manufacture comprising a U-shaped shackle bolt having a pair of spaced substantially parallel externally threaded legs and an integral projection offset to the outside of one of said legs adjacent its base, said projection being circular in shape and having an opening formed therein.

8. In a shackle connection, the combination of a U-shaped shackle bolt having spaced substantially parallel externally threaded legs connected by a base member and an integral projection extending to the outside of one of said legs adjacent its junction with said base, said projection having an opening formed therein.

JOHN W. LEIGHTON.